United States Patent [19]

Mabey et al.

[11] Patent Number: 5,175,870
[45] Date of Patent: Dec. 29, 1992

[54] POWER ECONOMISING IN MULTIPLE USER RADIO SYSTEMS

[75] Inventors: Peter J. Mabey, Comberton; David J. Harrison, Cambridge; Diana M. Ball, Comberton, all of England

[73] Assignee: U.S. Philips Corporation, New York, N.Y.

[21] Appl. No.: 445,078

[22] Filed: Nov. 30, 1989

[30] Foreign Application Priority Data

Dec. 23, 1988 [GB] United Kingdom ............... 8830200

[51] Int. Cl.⁵ .......................................... H04B 17/00
[52] U.S. Cl. ................................... 455/67.1; 455/231; 455/343; 370/95.3
[58] Field of Search ..................... 455/67, 68, 70, 89, 455/231, 343, 53, 54; 370/95.1, 95.3, 104.1; 340/525.44

[56] References Cited

U.S. PATENT DOCUMENTS

| | | | |
|---|---|---|---|
| 4,577,315 | 3/1986 | Otsuka | 370/95.3 |
| 4,612,637 | 9/1986 | Davis et al. | 370/95.3 |
| 4,742,352 | 5/1988 | Ishii | 455/89 |
| 4,955,038 | 9/1990 | Lee et al. | 455/343 |

FOREIGN PATENT DOCUMENTS 2063011 5/1981 United Kingdom .
2069799 8/1981 United Kingdom .

OTHER PUBLICATIONS

"A Signalling Standard for Trunked Private Land Mobile Radio Systems", U.K. Dept. Enterprise, Radio Communications Div., MPT 1327, Jan. 1988, pp. 9-1--9-3.

Primary Examiner—Curtis Kuntz
Assistant Examiner—Edward Urban
Attorney, Agent, or Firm—Anne E. Barschall

[57] ABSTRACT

A multiple user radio system comprising at least one primary station and a plurality of secondary stations by way of a control channel. The primary station in use sets a value, in a transmitted message from which a secondary station wanting to economise on power can derive a period during which it can switch-off at least its radio section. The radio system may comprise a radiopaging system or a radio trunking system using an Aloha protocol. In the case of a radio trunking system using an Aloha protocol, the value comprises the Aloha number.

34 Claims, 1 Drawing Sheet

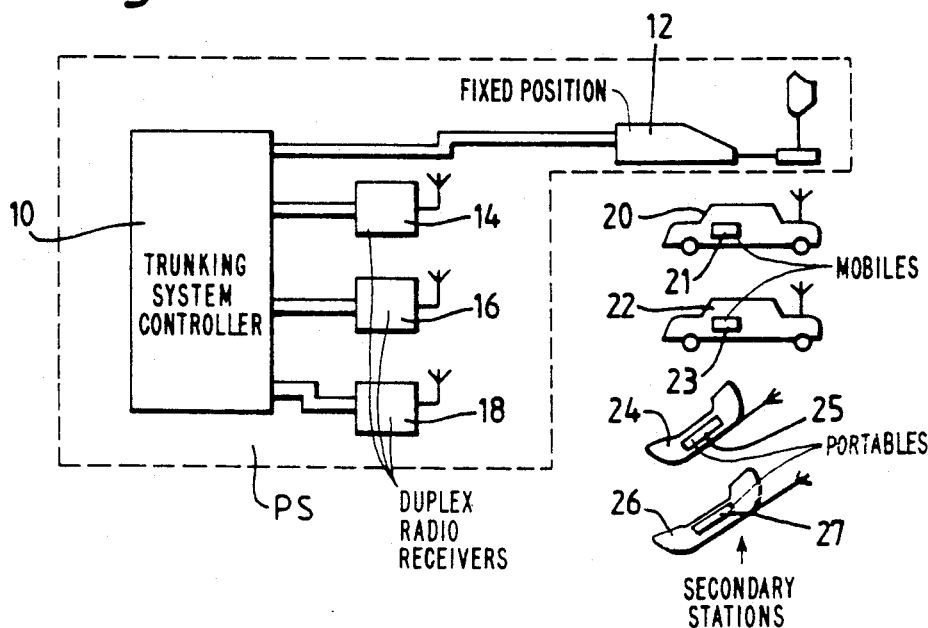
Fig.1.
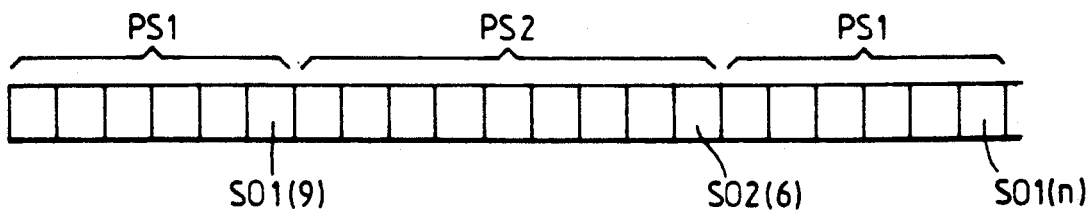
Fig.2.
Fig.3

POWER ECONOMISING IN MULTIPLE USER RADIO SYSTEMS

DESCRIPTION

The present invention relates to power economising in multiple user radio systems, particularly but not exclusively, in trunking systems using an Aloha protocol and radiopaging systems.

One such trunking system is the dynamic framelength slotted Aloha trunking system described and claimed in British Patent Specification 2069799B. A feature of this known system is that a trunking system controller forming part of a primary station determines on the basis of the recent history of the operation of the system the number of successive time slots it will make available on a control channel in which a secondary station wanting to make a call can make a request. During busy periods the number of time slots is relatively large whereas in slack periods the number is small, frequently unity. Generally a secondary station is kept energised so that it is able to remain fully synchronised with the primary station and able to react promptly when the user wants to make a call. In the case of secondary stations powered from relatively high capacity power sources, the continuous energisation of the secondary station causes an insignificant power loss over the typical period of use. However the situation is different with secondary stations powered from a relatively low capacity power source having only a short life before the power source has to be recharged or replaced. Frequent recharging or replacement of the power source may be inconvenient to the user, particularly if required while the user needs service.

An object of the present invention is to economise on the power consumed by the secondary station.

According to one aspect of the present invention there is provided a method of operating a multiple user radio system comprising a primary station and a plurality of secondary stations, the primary station transmitting an indication of the number of time slots which it is making available for secondary stations wishing to transmit to make random access, wherein a secondary station wanting to economise on power utilises the indication to derive a time period during which it can switch-off at least its radio section.

An embodiment of the multiple user radio system is a trunking system using an Aloha protocol. A benefit of using the indication in the message transmitted by the primary station is that in the case of a trunking system using, for example, a slotted Aloha protocol, the indication can serve a dual function, that is, to indicate the number of time slots in an Aloha frame as well as inform a secondary station wishing to operate a power economising mode of the time period during which it can switch-off.

The transmitted message may include a field containing a signal indicative of whether or not a secondary station is permitted to operate in a power economising mode. This enables the primary station to control the service, which may be degraded by secondary stations being temporarily unavailable, and enables a primary station to commence operation without power economy control and subsequently be upgraded to include power economy control.

If desired the population of the secondary stations having the capability of operating in a power economising mode may be divided into at least two subsets and the primary station is arranged to address the transmitted message containing the said indication to at least one of the subsets.

Alternatively the population of secondary stations may be divided into subsets with each subset having its own primary station, the primary stations sharing a control channel such that only one primary station is transmitting at any one time. With such an arrangement each primary station prior to terminating its transmission may signal to its sub-set the anticipated time period when it will not be transmitting and the secondary stations can de-energise their radio sections in response to receipt of the terminating signal. The primary station prior to terminating its transmission may also send separately or as part of the terminating signal an invitation to the secondary stations in its subset inviting them to transmit messages which can be responded to after the period of time when the at least one primary station is non-transmitting. Preferably the secondary stations of each sub-set re-energise their radio sections prior to the expiry of the anticipated time period in order that they will be able to re-synchronise themselves promptly when their primary station is operating.

In the event of a secondary station having a task requiring it to for example initiate, continue or complete a signalling transaction with a primary station, it can refrain from switching-off or can re-energise its radio section.

According to another aspect of the present invention there is provided a multiple user radio system comprising a primary station and a plurality of secondary stations, each secondary station comprising radio and control sections, wherein the primary station comprises means for transmitting an indication of the number of time slots which it is making available for secondary stations wishing to transmit to make random access and wherein at least one of the secondary stations comprises means for receiving said indication in the message to be transmitted and for deriving a time period from said indication and means for switching-off its radio section during a substantial proportion of said time period as a power economy measure.

According to a further aspect of the present invention there is provided a multiple user radio system comprising two or more primary stations sharing a control channel between different subsets of secondary stations so that only one of the primary stations is transmitting at any one time, each of the secondary stations having a radio section and a control section, wherein each primary station has means for signalling to its subset of secondary stations the period of time it will be non-transmitting, at least one of the secondary stations in the said subset has means responsive to said signal for de-energising at least the radio section of the at least one of the secondary stations for at least a substantial proportion of the period of time, each primary station comprises means for transmitting an indication of the number of time slots which it is making available for secondary stations wishing to transmit to make random access and wherein at least one of the secondary stations in the subset associated with the respective primary station comprises means for receiving said indication and for deriving a time period from said indication and means for switching-off at least the radio section of the at least one secondary station during a substantial portion of said time period as a power economy measure.

According to yet another aspect of the present invention there is provided a secondary station for use with the method in accordance with the present invention, comprising a radio section for providing communication with at least a primary station, and a control section for controlling the operation of the secondary station, the control section comprising means for deriving from said indication contained in the transmitted message a time period during which at least its radio section can be de-energised as a power economising measure.

The present invention will now be described, by way of example, with reference to the accompanying drawings, wherein:

FIG. 1 is a diagram of multiple access trunking radio system,

FIG. 2 illustrates the signalling between the primary station PS and a secondary station SS, and FIG. 3 illustrates the Aloha signalling when there are two primary stations serving respective populations (or subsets) of secondary stations, the levels of traffic in each population being different.

Referring to FIG. 1, the trunking system comprises a primary station PS including a trunking system controller (TSC) 10 which is coupled by duplex or half-duplex links to a fixed position 12 and to three duplex radio transceivers 14, 16, 18. In the drawings four secondary stations constituted by two mobiles 20, 22 and two portables 24, 26 are shown. Each secondary station is equipped with a radio transceiver 21, 23, 25 and 27, capable of maintaining a half-duplex link with any one of the transceivers 14, 16, 18 of the primary station PS and a control section. It is pointed out that there will be many more secondary stations than the number of transceivers 14, 16, 18. Communication between secondary stations is via the transceivers 14, 16, 18 controlled by the TSC 10 which comprises a computer, modulators and demodulators.

In operation most signalling between the primary station PS and the secondary stations 20, 22, 24 and 26 is done on a signalling (or control) channel, which may or may not be a dedicated channel. Each secondary station has its own address or identity which is stored in its control section. Once a call has been set up by the computer in the TSC 10 of the primary station PS then a speech channel is allocated to the mobiles/portables involved in the call. Calls involving secondary stations can be arranged on a group basis or on a one-to-one basis. Some signalling, for example that necessary to terminate a conversation, takes place on speech channels.

For wide area coverage, multiple fixed sites can be used. At these sites the signalling channel may be operated for example quasi-synchronously or sequentially, or a separate signalling channel may be used at each site. However for the sake of simplicity of description only a single site example will be described.

Suitable multiple access protocols which may be used in trunking systems operating in accordance with the method of the present invention are slotted Aloha protocols disclosed in for example British Patent Specifications 2063011 (fixed framelength) and 2069799B (dynamic framelength). When implementing this latter protocol the primary station monitors the number of garbled, successful and empty slots in each frame and the call arrival rate so that the TSC 10 can determine, by means of feedback, the length of the next Aloha frame.

The primary station from time to time broadcasts an Aloha message ALH(n) giving the number (n) of time slots available in which secondary stations can make requests for service, on a control channel. As mentioned above the TSC 10 determines the length of the next Aloha frame, that is, the number of time slots to be made available, based on the system performance. In the event of the radio traffic being light the Aloha number, n, is typically unity. This means that a secondary station on receiving this Aloha number can make its request (RQS) to the primary station in the next following time slot. If the call is to another secondary station then the primary station sends an ahoy (AHY) message to the addressed secondary station which in the next time slot transmits an acknowledgement message ACK. Thereafter the primary station allocates a speech channel by sending a go-to-channel (GTC) message to both secondary stations. In the event of the radio traffic being heavy then the primary station may make longer frames available to reduce congestion (or call collision) or sub-divide the population of secondary stations.

FIG. 2 illustrates by way of example the signalling between the primary station PS and a secondary station SS. In this example, the primary station PS transmits ALH(4), and a secondary station SS transmits a request RQS in the third of the four slots. Then the primary station transmits an ahoy (AHY) to an addressed secondary station in the next following slot. The primary station PS then transmits another Aloha message whilst in the same slot the addressed secondary station transmits an acknowledgement ACK. In response to the ACK, the primary station uses the next slot to transmit a go-to-channel (GTC) message. Thereafter the two secondary stations switch from the control channel to a speech channel.

Fuller details of suitable message structures are disclosed for example in MPT 1327 A Signalling Standard for Trunked Private Land Mobile Radio Systems published by the Radiocommunications Division of the Department of Trade and Industry London 1988. Accordingly in the interests of brevity the basic signalling will not be described further.

In order for the system to be able to minimise call set-up times it is preferred that the secondary stations be continuously energised to make requests to, or receive AHY messages from, the primary station. Assuming that the power source for the transceivers in a secondary station has a sufficiently large capacity then there are no problems in keeping the transceivers fully energised. However with a portable secondary station, it is generally the case that the capacity of the internal power source, for example batteries, is marginal and accordingly it is desired that the trunking system be able to implement battery economising techniques.

In accordance with the present invention, the primary station transmits an indication of the number of time slots which it is making available for secondary stations wishing to transmit to make random access, and a secondary station wishing to economise on power can derive from said indication a period during which it can switch-off at least its radio section but leave its control section energised. The said indication may for convenience be the Aloha number (n). The transmitted message may include an indication of as to whether a secondary station is permitted to operate in a power economising mode. The ability of the primary station to be able to send such a message enables the primary station to control the call set-up times, and also provides a ready upgrade path between primary station without and with power economy control.

The control section of a secondary station which wishes to initiate a call or continue a call can energise or maintain energised its radio section rather than adopt a power economising mode. Once a call has been completed then the secondary station can revert to the power economising mode.

When the radio traffic is light and the Aloha number is low, typically unity, then in order to avoid the secondary stations being fully energised substantially continuously because the Aloha framelength corresponds to one or two slots, the TSC 10 may transmit a signal which the secondary station may use to derive a time period during which it can practice power economising by switching-off its radio section.

During the period when a secondary station has switched-off its radio section to economise on power, any requests for the economising secondary station either have to be stored and the AHY message transmitted after the secondary station has been re-energised or the calling station is requested to try again after the "off" time period has elapsed. When re-energising the secondary stations, a time allowance has to be made for them to re-synchronise themselves. Generally the larger the number of timeslots which have been signalled by the primary station, the longer the time allowance which has to be allocated for re-synchronisation.

In the event of the trunking system having a single primary station and a large number of secondary stations, then their population can be divided into sub-sets. In operation only one sub-set at a time is switched-off by a suitable signal produced by the primary station. Division of the population can be done by giving each sub-set a respective group address. By switching-off one sub-set at a time, the operation of the system is not degraded too seriously. Secondary stations in the subset which is not switched-off can still practice power economising individually.

In an alternative arrangement to the one just described, each subset has its own primary station, only one of which is energised at any one time. However the actual period during which each primary station is active may be fixed or may be variable and depend on the level of radio traffic in the respective subsets. FIG. 3 illustrates a number of time slots and how they are shared between two primary stations PS1 and PS2. In the last slot of the number of slots made available to each primary station, the respective primary station transmits a value which constitutes a transmitter switch-off signal, that is SO1 and SO2 for PS1 and PS2, respectively, indicating the number of slots, shown in parenthesis in FIG. 3, during which the radio sections of the secondary stations in its subset can be switched-off. Additionally power economising can be practised amongst the secondary stations forming the energised subset, for example by dividing each subset into at least two portions, only one portion being energised at any one time during the overall period allocated to the particular subset and/or by permitting the energised secondary stations to practice power economising on an individual basis. The value transmitted in the last slot also constitutes an invitation message for secondary stations to access the primary station which will respond when it switches-on again.

Although the present invention has been particularly described with reference to a radio trunking system, there are other multiple user radio systems, such as radiopaging systems, in which flexible options for controlling battery economy would be useful.

We claim:

1. A method of economizing power in a multiple user radio system which includes a primary station and a plurality of secondary stations, the primary and secondary stations each including respective transceiving means for communicating between the primary and secondary stations, the method comprising the steps of:
   a) in a primary station, making available a number, n, of time slots in a framing protocol;
   b) transmitting by the primary station, following expiration of a last time slot of a preceding frame, an indication of a number, n, of time slots available to secondary stations in a following frame of time slots;
   c) choosing, in any secondary station, one of said n time slots at random;
   d) transmitting by such secondary station a request for access to the system in the one time slot;
   e) in one secondary station, deriving a time period from said indication; and
   f) in the one secondary station, switching off at least the transceiving means during said time period, to economize power when the one secondary station does not need access to the system.

2. A method as claimed in claim 1, characterised in that the radio system is a trunking system using an Aloha protocol.

3. A method as claimed in claim 1, further comprising the step of from the primary station, transmitting an indication as to whether a secondary station is permitted to operated in a power economising mode.

4. A method as claimed in claim 1, wherein those secondary stations having the capability of operating in power economising mode are divided into at least two subsets, and further comprising the step of, in the primary station, addressing a message containing the indication of the number of available time slots to at least one of the subsets.

5. A method as claimed in claim 1, further comprising, in a secondary station which has a task requiring it to be operating continuously,
   i) refraining from switching-off; or
   ii) if the respective transceiving means has been de-energised, re-energising the respective transceiving means.

6. A method as claimed in claim 1, further comprising in a secondary station needing to initiate, continue or complete a signalling transaction with the primary station
   i) refraining from switching-off; or
   ii) if the respective transceiving means has been de-energised, re-energising the respective transceiving means.

7. A method as claimed in claim 1, wherein the secondary stations are divided into respective subsets with each respective subset having a respective primary station, further comprising the steps of
   sharing a control channel among the primary stations such that only one primary station is transmitting at any one time, and
   in each respective primary station, prior to terminating transmission, signalling to the respective subset an anticipated time period during which the respective primary station will not be transmitting.

8. A method as claimed in claim 7, further comprising, in at least one secondary station, re-energising the respective transceiving means prior to expiration of the anticipated time period.

9. A method as claimed in claim 7, further comprising the step of, from at least one of the primary stations, transmitting an invitation to the secondary stations in the respective subset inviting them to transmit messages which, if the messages are to be responded to, are to be responded to after the anticipated time period when the at least one primary station is not transmitting.

10. A method as claimed in claim 9, characterised in that the signal indicative of the anticipated time period when the primary station will be switched-off and the invitation are one and the same message.

11. A method as claimed in claim 1, further comprising the step of storing messages, which are intended for the one secondary station when the one secondary station is practising power economising, in the primary station.

12. A method as claimed in claim 1 further comprising accessing the system by the secondary stations when the primary station is switched-off.

13. A secondary station for use in the method as claimed in claim 1, comprising a radio section for providing communication with at least a primary station, and a control section for controlling the operation of the secondary station, the control section comprising means for deriving from said indication contained in the transmitted message a time period for switching off at least its radio section as a power economising measure.

14. A secondary station as claimed in claim 13, comprising means responsive to the receipt of said indication for randomly selecting one of said time slots in which to transmit a request for access to the system for transmission by the secondary station.

15. A secondary station as claimed in claim 13, characterised in that the control section further comprises means for deriving from a field contained in a transmitted message a signal indicating whether or not the secondary station is permitted to operate in a power economising mode.

16. A secondary station as claimed in claim 13, further comprising means responsive to its control section requiring the secondary station to be operating continuously for refraining from switching off or for re-energising its radio section.

17. A secondary station as claimed in claim 13, further comprising means responsive to the control section requiring the secondary station to initiate, continue or complete a signalling transaction with the primary station for refraining from switching-off or re-energising its radio section.

18. A method as claimed in claim 1 wherein the number n varies from frame to frame.

19. A method as claimed in claim 1 wherein the number n is not determined dynamically from frame to frame.

20. A multiple user radio system comprising
a) a plurality of secondary stations, each including
   i) a respective radio section; and
   ii) a respective control section;
b) a primary station including transmitting means for transmitting an indication of the length of a frame including a number, n, of time slots which the primary station is making available for secondary stations wanting to transmit to make random access; said transmitting means transmitting the indication after expiration of a last time slot of a preceding frame;
c) at least one of the secondary stations including
   i) means for receiving said indication;
   ii) means for deriving a time period from said indication; and
   iii) means for switching off the respective radio section during a substantial portion of said time period as a power economy measure.

21. A system as claimed in claim 20, wherein the system is a trunking system using an Aloha protocol and in that the at least one of the secondary stations comprises means responsive to the indication in the transmitted signal for deriving the number of timeslots in an Aloha frame.

22. A system as claimed in claim 20, wherein
the primary station has means for enabling the secondary stations to operate in a power economising mode and for signalling the enabling in a field of a message to be transmitted; and
the control section of at least one of the secondary stations includes means for detecting said field in a transmitted message and means responsive to the signal in said field for permitting the secondary station to operate in a power economising mode.

23. A system as claimed in claim 20, wherein
those secondary stations having the means for switching off are divided into at least two subsets and
the primary stations has means for addressing 9 transmitted message containing said indication to at least one of the subsets.

24. A system as claimed in claim 20, wherein a secondary station comprises means, responsive to the respective control section requiring the secondary station to be operated continuously, for refraining from switching-off or for re-energising the respective radio section.

25. A system as claimed in claim 20 wherein a secondary station comprises means, responsive to the respective control section requiring the secondary station to initiate, continue or complete a signalling transaction with the primary station, for refraining from switching-off or for re-energising the respective radio section of the secondary station.

26. A system as claimed in claim 20 wherein the number n varies from frame to frame.

27. A system as claimed in claim 20 wherein the number n is not determined dynamically from frame to frame.

28. A multiple user radio system comprising
a plurality of secondary stations, divided into at least two subsets, each secondary station having a respective radio section and a respective control section;
a control channel between the secondary stations;
at least two respective primary stations, a respective one for each of the subsets, sharing the control channel between the subsets so that only one of the primary stations is transmitting at any one time, wherein
each primary station has respective means for signalling to its subset a period of time that primary station will be non-transmitting,
at least one of the secondary stations in each subset has means responsive to said signalling from the respective primary station for switching off at least the radio section of the at least one of the secondary stations for at least a substantial portion of the period of time,
each primary station has respective means for transmitting an indication of a number of time slots which that primary station is making available for secondary stations wishing to transmit to make random acces, and at least one of the secondary stations in each subset has means for receiving said indication and for deriving a second time period from said indication, and means for switching-off at least the respective radio section of the at least one secondary station during a substantial portion of said second time period as a power economy measure.

29. A system as claimed in claim 28, characterised in that the system is a trunking system using an Aloha protocol and in that the at least one of the secondary stations comprises means responsive to the indication for deriving the number of time slots in an Aloha frame.

30. A system as claimed in claim 29, wherein the primary station has means enabling secondary stations to operate in a power economising mode and for signalling the enabling in a field of a message to be transmitted, and the control section of at least one of the secondary stations includes means for detecting said field in a transmitted message and means responsive to the signal in said field for permitting the secondary station to operate in the power economising mode.

31. A system as claimed in claim 28, wherein at least one of the subsets includes at least two of the secondary stations having the means for switching-off and that at least one of the subsets is divided into at least two further subsets and the respective primary station of that at least one of the subsets has means for addressing a transmitted message containing said indication to at least one of the further subsets.

32. A system as claimed in claim 28, wherein at least one of the secondary stations comprises means, responsive to the respective control section requiring the at least one of the secondary stations to be operating continuously, for refraining from switching-off or for re-energising the respective radio section.

33. A system as claimed in claim 28, wherein at least one of the secondary stations comprises means-responsive to the respective control section requiring the at least one of the secondary stations to initiate, continue or complete a signalling transaction with its respective primary station—for refraining from switching-off or for re-energising the respective radio section.

34. A system as claimed in claim 28, wherein at least one of the primary stations includes means for transmitting an invitation message to secondary stations inviting them to transmit messages which, if such messages are to be responded to, are to be responded to after said period of time during which the primary station is non-transmitting.

* * * * *